US007318628B2

(12) United States Patent
Guile

(10) Patent No.: US 7,318,628 B2
(45) Date of Patent: *Jan. 15, 2008

(54) MULTIPLE DIRECTIONAL WHEEL

(75) Inventor: Graham Guile, Hallidays Point (AU)

(73) Assignee: Innowheel Pty Ltd, New South Wales (AU)

( * ) Notice: Subject to any disclaimer, the term of this patent is extended or adjusted under 35 U.S.C. 154(b) by 245 days.

This patent is subject to a terminal disclaimer.

(21) Appl. No.: 11/050,083

(22) Filed: Feb. 2, 2005

(65) Prior Publication Data

US 2005/0134106 A1    Jun. 23, 2005

Related U.S. Application Data

(63) Continuation-in-part of application No. PCT/AU03/01002, filed on Aug. 7, 2003, and a continuation-in-part of application No. 10/275,530, filed as application No. PCT/AU01/01175 on Sep. 20, 2001, now Pat. No. 6,857,707.

(30) Foreign Application Priority Data

Sep. 21, 2000   (AU)   ..................... PR0296
Aug. 7, 2002    (AU)   ............... 2002950635

(51) Int. Cl.
    *B60B 19/12*    (2006.01)
(52) U.S. Cl. .......................... 301/5.23; 16/47
(58) Field of Classification Search ............... 301/5.23, 301/5.301, 5.305, 5.1; 16/18 R, 45, 46, 47
    See application file for complete search history.

(56) References Cited

U.S. PATENT DOCUMENTS

| 1,326,679 | A |   | 12/1919 | MacBeth et al. |
| 3,040,371 | A | * | 6/1962  | Rice et al. ................... 16/31 R |
| 3,465,843 | A |   | 9/1969  | Guinot ....................... 180/79.3 |
| 3,789,947 | A | * | 2/1974  | Blumrich .................... 180/6.48 |
| 3,882,885 | A |   | 5/1975  | McCain ....................... 137/344 |
| 4,006,810 | A |   | 2/1977  | Kornylak |
| 4,223,753 | A |   | 9/1980  | Bradbury .................... 180/6.2 |
| 4,335,889 | A |   | 6/1982  | Hiscock ...................... 280/259 |
| 4,715,460 | A |   | 12/1987 | Smith |
| 4,926,952 | A |   | 5/1990  | Farnam ...................... 180/6.5 |

(Continued)

FOREIGN PATENT DOCUMENTS

AU           561 380 B2    5/1987

(Continued)

*Primary Examiner*—Russell D. Stormer
(74) *Attorney, Agent, or Firm*—Pedersen & Co., PLLC; Ken J. Pedersen; Barbara S. Pedersen

(57) ABSTRACT

A multiple directional wheel includes a frame having a central hub rotatable about a main axis, a plurality of roller supports radially spaced from the central hub, and a plurality of rollers evenly spaced around the circumference of the wheel and rotatably mounted on the roller supports. The rollers are preferably rotatable about a corresponding plurality of roller axes aligned in the plane of the wheel and transverse to the main axis. Preferably, the frame is integrally formed in a first molding process and the rollers are formed in place on the wheel about the roller supports in a separate process. In another embodiment there is disclosed a multiple directional wheel including a pair of opposed, separately integrally-formed first and second frames.

26 Claims, 7 Drawing Sheets

U.S. PATENT DOCUMENTS

| | | |
|---|---|---|
| D309,254 S | 7/1990 | Guile .......................... D8/375 |
| 4,981,203 A | 1/1991 | Kornylak |
| 5,035,314 A | 7/1991 | Kornylak ..................... 193/37 |
| D318,791 S | 8/1991 | Guile .......................... D8/375 |
| 5,213,176 A | 5/1993 | Oroku et al. |
| 5,323,867 A | 6/1994 | Griffin et al. ................. 180/22 |
| 5,536,074 A * | 7/1996 | Hsu et al. ................ 301/5.301 |
| 6,357,765 B1 | 3/2002 | Heien ........................ 280/5.26 |
| 6,619,823 B2 * | 9/2003 | Dai ........................... 362/500 |
| 6,857,707 B2 * | 2/2005 | Guile ........................ 301/5.23 |
| 2002/0057010 A1 * | 5/2002 | Harris ....................... 301/5.23 |

FOREIGN PATENT DOCUMENTS

| | | |
|---|---|---|
| DE | 3702660 | 8/1988 |
| WO | WO 00/12327 | 3/2000 |
| WO | WO 02/24471 | 3/2002 |
| WO | WO 02/46031 | 6/2002 |
| WO | WO 2004/014667 | 2/2004 |

\* cited by examiner

MULTIPLE DIRECTIONAL WHEEL

This application is a continuation-in-part, and claims priority, of PCT/AU2003/001002 (filed Aug. 7, 2003), which claims priority of Australian Patent Application 2002 950635 (filed Aug. 7, 2002), and this application is also a continuation-in-part, and claims priority, of U.S. patent application Ser. No. 10/275,530, which was filed Mar. 20, 2003 as a 371 National Entry of PCT Application PCT/AU01/01175 (filed Sep. 20, 2001), which claims priority of Australian Patent Application PR 0296 (filed Sep. 21, 2000).

U.S. patent application Ser. No. 10/275,530, issued as U.S. Pat. No. 6,857,707, on Feb. 22, 2005, is incorporated herein by this reference.

FIELD OF INVENTION

The invention relates to a wheel. More particularly, this invention relates to a wheel adapted to travel in more than one direction.

BACKGROUND

The following description of the prior art and of embodiments in Applicant's previously-filed applications, PCT/AU01/01175 and U.S. patent application Ser. No. 10/275,530, are not intended to be, nor should it be interpreted as, an indication of the common general knowledge pertaining to the invention.

Traditionally, caster wheels have been used to provide wheel support for a wide range of items for which mobility is desirable. The caster wheel has a single wheel rotatable about a general horizontal axis which in turn is mounted to a substantially vertical axis thereby enabling a wheel to travel in any direction from which it is pulled. Caster wheels are generally made of multiple components made of different materials and can require a costly and involved manufacturing process. Moreover, the caster wheel is generally mounted on an object to be moved by a vertical axle making attachment of the wheel to the object sometimes difficult to achieve as access to the underside may be limited and/or awkward.

More recently, another type of wheel capable of multiple directional travel has been considered and includes a central hub rotatable about a main axis and a number of independently mounted rotatable rollers located about the rim of the hub. An improvement on such types of wheel has been described in International Patent Application No. PCT/AU01/01175 by the present applicant and published as WO02/24471, and in U.S. patent application Ser. No. 10/275,530, which is herein incorporated by reference. The multiple directional wheel as described in that specification was constructed by molding or casting a pair of polyaxled rings comprising a plurality of evenly spaced axles about the circumference of each ring. The method then involved the assembly of a roller about each corresponding evenly spaced axle of the multi sided ring. The finished polyaxled rings were then pressed into a wheel frame and the final product was sealed with the corner portions of the polyaxled ring being fixed to supports of the wheel frame. This manufacturing process is complex as a polyaxled ring is required to be molded separately from that of the remainder of the wheel.

Moreover, the applicant's previously described multiple directional wheel requires the polyaxled wheels to be used in pairs, their adjacent rollers offset relative to one another to ensure good ground contact.

Accordingly, a multiple directional wheel which is relatively inexpensive and simple to manufacture compared to existing wheels and/or a useful manufacturing method alternative to existing wheels is desired.

OBJECT OF INVENTION

The object of the invention is to provide a multiple directional wheel and method of construction which ameliorates one or more of the disadvantages of the prior art or at least provides a useful alternative thereto.

SUMMARY OF INVENTION

In one aspect of the invention there is provided multiple directional wheel including:
(a) a frame having a central hub rotatable about a main axis and a plurality of roller supports radially spaced from said central hub;
(b) a plurality of rollers evenly spaced around the circumference of said wheel and rotatably mounted on said roller supports, said rollers rotatable about a corresponding plurality of roller axes substantially aligned in a general plane of said wheel normal to the main axis and transverse to said main axis,
wherein said frame is integrally formed in a first molding process and said rollers are formed in place on the wheel about said roller supports in a separate process. The frame may include two or more series of rollers located spaced and parallel to one another.

Each roller may be formed in place on the wheel by one of two different types of methods. A first method includes attaching a temporary sleeve to cover the roller support, the external surface of the temporary sleeve defining an internal bore of the roller to be formed. The temporary sleeve may be in the form of a hollow cylinder of rigid material which may be subsequently dissolved or otherwise destroyed following the successful formation of the roller. The temporary sleeve may comprise a material selectively dissolvable in a solvent in respect of which the frame and roller material are, such as an acid or an organic solvent.

The formation of the roller may include the formation of a tire around the temporary sleeve or the bush. Where a temporary sleeve is used, the material of the temporary sleeve and that of the tire may be mutually non-adherent to facilitate removal of the sleeve by chemical, solvent, mechanical or heat (including cold) means.

The roller support may include a variety of formations capable of rotatably supporting the roller mounted thereon. The roller support may include a single terminal axial stub. The roller support may include a pair of opposed coaxial stubs or axle protrusions extending part way along the length of the roller. Preferably, the roller support is in the form of a single axle extending the full length of the roller.

Preferably, however, the roller includes a permanent bush rotatably mounted on a corresponding roller support. The bush may define one or more recesses operative to receive the roller support.

Preferably, the tire is fixedly secured to the bush. For this purpose, the bush may include external surface features which facilitate adherence of the tire to the bush. The surface features may include lateral, longitudinal, and/or diagonal ridges, protrusions optionally hooked, or grooves, recesses and the like to improve the mechanical, positive engagement of the tire material to the bush.

The bush may be made up of sub parts or components. The components may be attachable together for mounting the bush onto the roller support. The components may be a pair of complementary members which may be attached together. The attachment means for the bush components may include, chemical, adhesive, welding or mechanical means. Preferably, the bush components are attached by mechanical means, such as male/female engagement means/members.

The bush components may be hinged together during manufacture to facilitate easy assembly around the roller support, the free edges being engageable together, such as by complementary engagement means/members. The bush components may be identical and can thus be made using the same die. Preferably, the bush components are integrally formed by injection molding involving the formation of a hinge such as a thin strip of material extending partially or fully along the hinged edges of the bush components.

The frame may include a plurality of arms extending from the hub to the roller supports whereby the roller supports are consistently radially spaced from the hub. Preferably, the arms extend radially from the hub. The roller supports may extend between adjacent arms and coaxially with the roller axis. The roller support is preferably in the form of a roller axle extending between adjacent radial arms.

Accordingly, in another aspect of the invention there is provided a multiple directional wheel including:
(a) an integrally formed frame having a central hub rotatable about a main axis, a plurality of radial arms extending outwardly from said central hub and a plurality of roller supports radially spaced from said central hub and extending between adjacent said radial arms;
(b) a plurality of bushes, each bush rotatably mounted on one of said roller supports and operative to freely rotate about said roller support and said corresponding roller axis; and
(c) a plurality of roller tires evenly spaced around the circumference of said wheel, each tire fixedly secured on one of said bushes, wherein each pair of roller tire and bush constitutes a roller and said plurality of rollers is rotatable about a corresponding plurality of roller axes aligned in the plane of said wheel and transverse to said main axis.

Furthermore, in one preferred form of the invention there is provided a multiple directional wheel including:
(a) an integrally formed frame including a central hub rotatable about a main axis, a plurality of radial arms extending outwardly from said central hub and roller supports between adjacent said radial arms, said roller supports being integrally molded with said central hub and said radial arms;
(b) a discontinuous rim mounted on said radial arm; and
(c) a plurality of rollers together forming said rim, said rollers being regularly spaced around said rim, each said roller rotatable about a roller support having one of a plurality of roller axes, each said roller axis aligned transverse to said main axis, wherein:
(i) at any one time in the rotation of said wheel about the main axis, at least one of said rollers is operative to have effective ground contact; and
(ii) each said roller includes a roller tire and a bush, each said bush being able to rotate around said roller support and about said roller axis, each said tire formed on each corresponding said bush to form each said roller.

In another aspect of the invention there is provided a double multiple directional wheel including a pair of wheels, each of the first and second wheels as described above, wherein said second wheel is fixed to said first wheel, the rollers of said second wheel are offset relative to the rollers of said first wheel about said double wheel's main axis whereby, when viewed in side elevation, the circumferential outline of said double wheel is substantially continuous and circular.

The first and second wheels may be formed separately. They may include complementary male and female engagement means by which they are joined. The first and second wheels may be joined by welding the respective hubs together. Preferably, the respective first and second frames are joined by ultrasonic welding. Preferably, the first and second frames are rigidly joined by inserting male engagement means in the form of protrusions into female engagement means in the form of recesses and fusing the joins by ultrasonic welding.

Alternatively, the first and second wheels may be joined by traditional means, such as mechanical fastening means including screws, nuts and bolts, and interference fits combined with fusing or welding methods, such as ultrasonic welding.

In another arrangement, the first and second frames may be formed integrally followed by the attachment and formation of the rollers thereon.

Accordingly, in another preferred form of the invention, there is provided a method of forming a multiple directional wheel having an integrally formed wheel frame including a central hub portion rotatable about a main axis; a rim portion having at least two rims, each rim being formed by a plurality of rollers regularly spaced around the circumference of the rim with each said roller being rotatable about an axis transverse to the main axis and when viewed from a side elevation there being a substantial overlap of diagonally adjacent said rollers on each of the at least two rims such that the wheel is capable of making good ground contact by at least one of the rollers, said method of forming the multiple direction wheel including the steps of:
forming at least two body parts, each said body part having a center hub with radial arms extending outwardly therefrom with roller supports extending between adjacent said radial arms, said roller supports being integrally molded with said center hub and said radial arms of each said part;
forming a plurality of bushes around each said roller support, each said bush being able to rotate around said roller support;
forming roller tires onto each hinged bush to form said rollers; and
joining said two parts together to form said integrally formed wheel.

Preferably the bushes are hinged and formed in two halves which in turn clip around the roller supports. The roller tires are preferably injection molded onto the hinged bush.

In a preferred form, the two body halves complete with rollers are ultrasonic ally stud welded together to form the wheel.

In another aspect of the invention there is provided a multiple directional wheel for movably supporting an article including:
(a) a pair of opposed separately integrally formed first and second frames, each said frame including a central hub rotatable about a main axis, a plurality of radial arms extending outwardly from said central hub and roller supports extending between adjacent said radial arms, said roller supports being integrally molded with said central hub and said radial arms;
(b) a discontinuous rim mounted on each said central hub, said first frame offset relative to said second frame about said main axis whereby, when viewed in side elevation, the circumferential outline of said wheel is substantially continuous and circular; and
(c) a plurality of rollers together forming each said rim, said rollers being regularly spaced around each said rim, each said roller rotatable about a roller support having one of a plurality of roller axes, each said roller axis aligned transverse to said main axis,
wherein each said roller includes a roller tire and a bush, each said bush being able to rotate around said roller support and about the corresponding roller axis, each said tire formed on each corresponding said bush to form each said roller.

The article which may be movably supported by the wheel according to the invention may include a trolley, such as a shopping trolley, prays, infant pushers, furniture, such as pianos, and white goods such as friends and washing machines. Accordingly, the multiple directional wheel may be suitable for supporting articles constituting or possessing high loads. The strength of the wheel, including its various components, may be tailored to suit the particular application, whereby stronger, more rigid materials may be used to support heavier loads, whereas lighter loads, such as prays, may involve the use of multiple directional wheels made to less rigid specifications and higher tolerances. In applications where noise may be an issue, roller tire materials may be softer and sound absorbing, trading off properties such as hard wearing, strength and abrasion resistance. Where strength, longevity and abrasion resistance are an issue, harder compounds may be used to form the roller tires, such as polyurethane.

In another aspect of the invention there is provided a method of forming a multiple directional wheel including the steps of:
(a) forming a frame comprising a central hub rotatable about a main axis and a plurality of roller supports spaced from said central hub, said roller supports being integrally molded with said central hub, each said roller support aligned with one of a plurality of corresponding roller axes, each said roller axis aligned in the general plane of said frame transverse to said main axis;
(b) mounting a bush around each said roller support, each said bush being able to rotate around one of said roller supports about its corresponding roller axis; and
(c) forming a tire around each of said bushes in place on said frame whereby each said tire and bush combination constitutes a roller.

The frame formed by the method may further include a plurality of arms interposed between the hub and the roller supports whereby to space the roller supports radially from the hub. The arms may be radial arms extending from the hub to the rim of the wheel. Each roller support may comprise an axle extending between adjacent radial arms. The method of forming the multiple directional wheel may include the further step of:
(d) securely fixing a second frame like the first frame described above in relation to the above method to the first frame such that the second frame is fixed coaxially to the first frame and the first and second frames are rotatably mountable on a single axle inserted through their respective hubs.

The second frame may be axially offset relative to the first frame about the main axis so that each roller of the first frame is located diagonally adjacent a pair of rollers of the second frame. This arrangement ensures that the wheel according to the invention at any time provides good ground contact via at least one roller from each of the first and second frames.

Accordingly, whilst a multiple directional wheel including a single frame may be adequate for some purposes where light loads are anticipated, generally a dual or triple framed wheel or a wheel with two or more series of spaced and parallel rollers will be more suitable for heavy load applications.

Step (d) of the above described method may involve welding the first and second frames together. Preferably the welding step involves ultrasonic welding. One or both of the first and second frames may include male engagement means and one or both of the first and second frames may include complementary female engagement means. Preferably, the male engagement means are on one of the first or second frames and the female engagement means are on one of the first or second frames. However, the first and second frames may be identical and include both complementary male and female engagement means.

In another arrangement, the multiple directional wheel may include a third frame and roller combination rigidly joined to the second frame. In such a triple frame arrangement, the rollers of the first, second and third frames are offset relative to one another to provide optimum ground surface contact of at least one roller at any one time.

In yet another aspect of the invention, there is provided a multiple directional wheel for movably supporting an article including:
(a) a pair of opposed integrally formed first and second frames, each said frame including a central hub rotatable about a main axis, a plurality of radial arms extending outwardly from said central hub and roller supports between adjacent said radial arms, said roller supports being integrally molded with said central hub and said radial arms;
(b) a discontinuous rim mounted on each said central hub, said first frame offset relative to said second frame about said main axis whereby, when viewed in side elevation, the circumferential outline of said wheel is substantially continuous and circular; and
(c) a plurality of rollers together forming each said rim, said rollers being regularly spaced around each said rim, each said roller rotatable about a roller support having one of a plurality of roller axes, each said roller axis aligned transverse to said main axis, wherein:
 (i) when viewed from said side elevation, said adjacent rollers of each said rim present an external surface which generally follows said circumferential outline of said wheel such that said external surface of each said roller forms an arc portion of said circumferential outline;
 (ii) at any one time in the rotation of said wheel about the main axis, at least one of said rollers is operative to have effective ground contact; and
 (III) each said roller includes a roller tire and a bush, each said bush being able to rotate around said roller support and about the corresponding roller axis, each said tire formed on each corresponding said bush to form each said roller.

BRIEF DESCRIPTION OF THE DRAWINGS

The preferred embodiments of the present invention may be better understood from the following brief description of the drawings, and from the following DETAILED DESCRIPTION OF THE PREFERRED EMBODIMENTS, which is a non-limiting description made with reference to the drawings, in which.

DETAILED DESCRIPTION OF THE PREFERRED EMBODIMENTS

Referring to the Figures, there are shown some, but not the only, embodiments of the invention.

Figure 1:
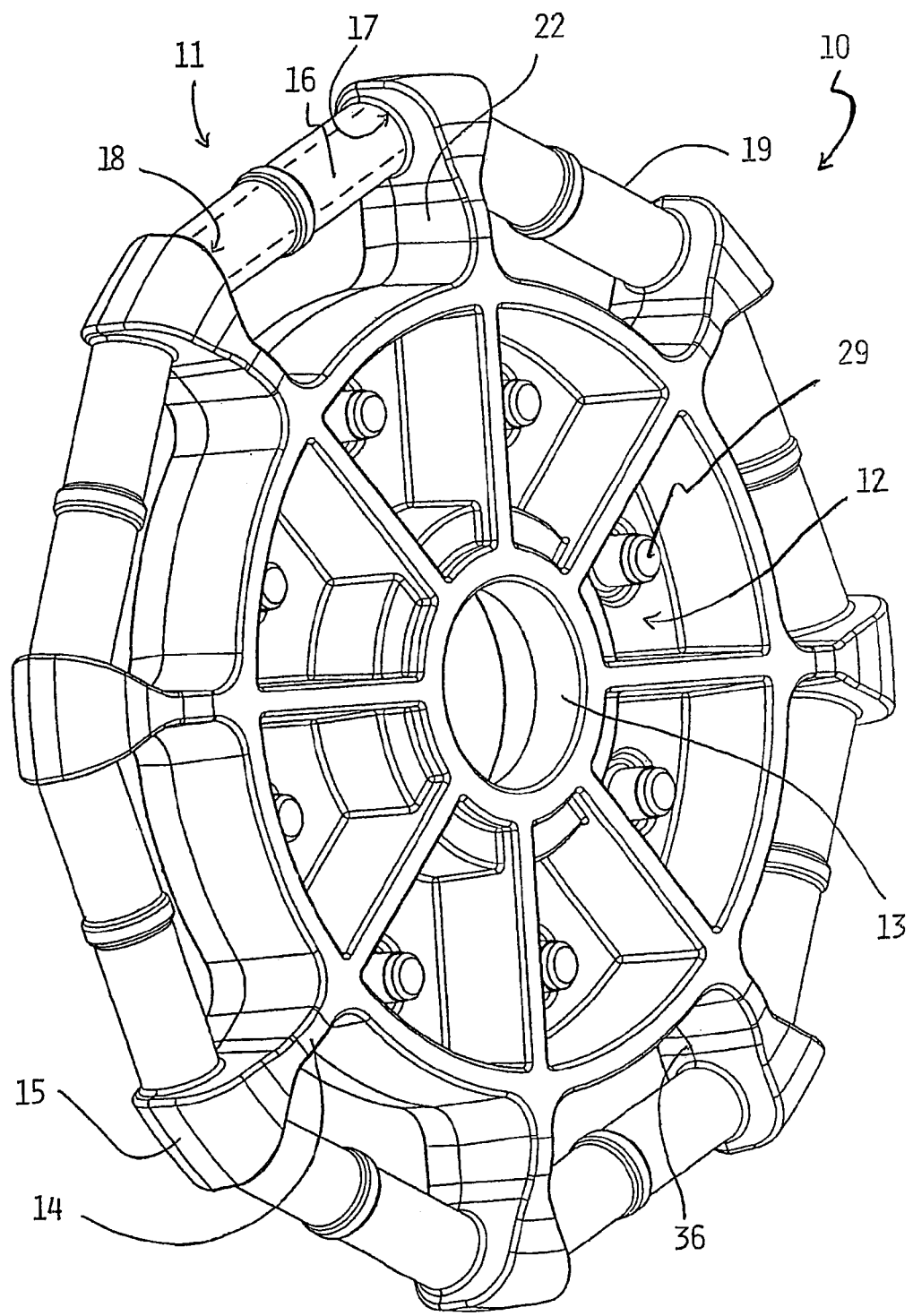
FIG. 1 is a perspective view of one part of an integrally formed wheel of the present invention.
Figure 4:
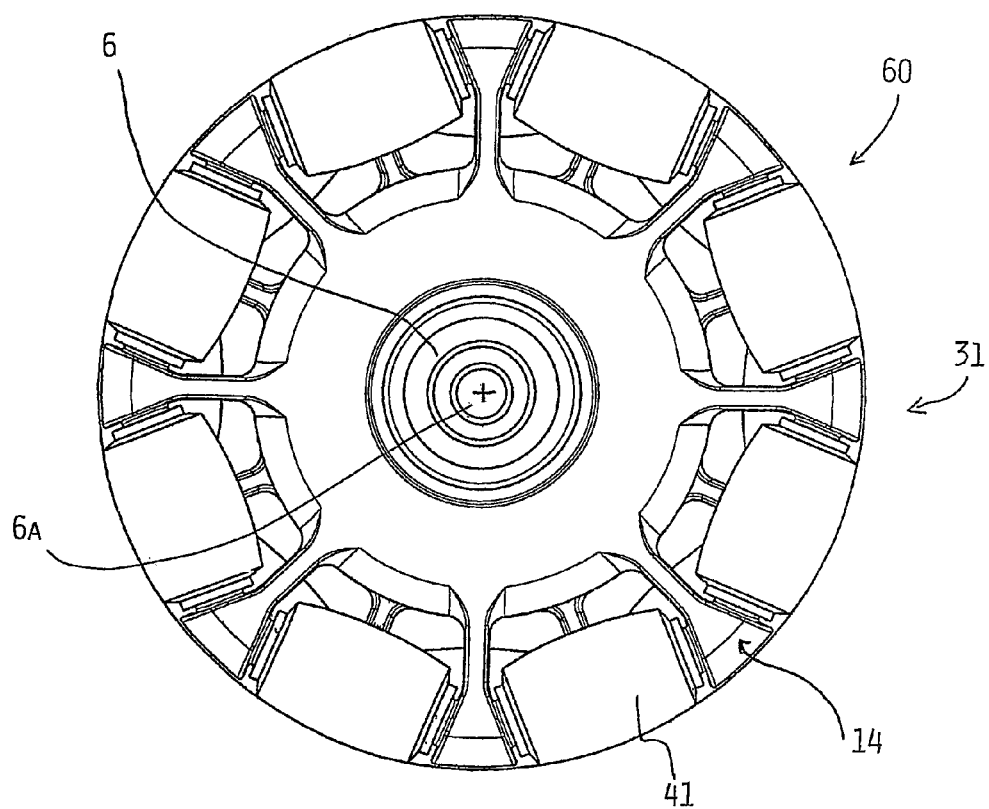
FIG. 4 is a side elevational view of a completed wheel according to the first embodiment.
Figure 5:
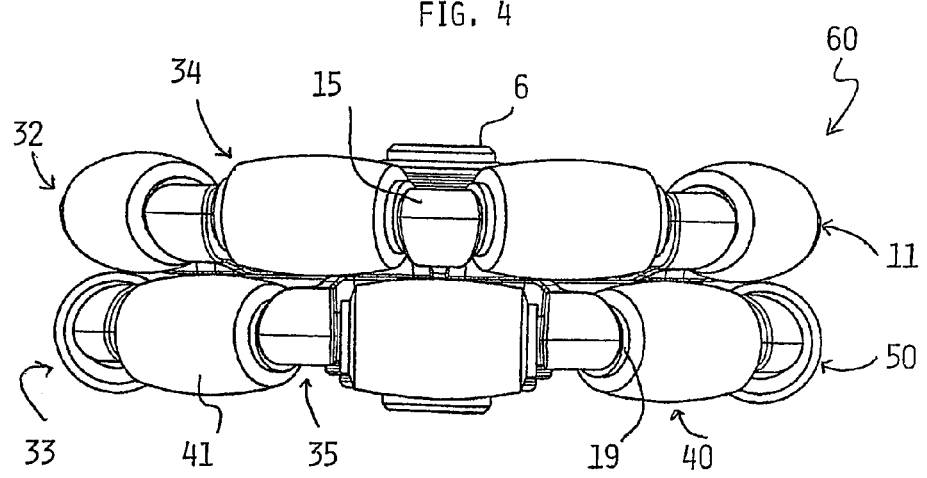
FIG. 5 is an end view of the wheel of FIG. 4.

In FIG. 1, there is shown part of a first wheel 10 which part comprises a frame 1 1 which includes a central hub 12 defining a bore 13 for a main axle 6 (see FIGS. 4 and 5). Extending radially out from the hub 12 is a plurality of evenly spaced radial arms 14 terminating in diverging head portions 15. The head portion 15 include internal walls 22 which follow the diverging curve of the head portions 15 so that the walls 22 of adjacent radial arms 14 present opposed, square-on faces. Extending between each adjacent pair of head portions 15 is a roller axle 16 represented by broken lines. Each roller axle 16 is a cylindrical roller axle 16 represented by broken lines. Each roller axle 16 is substantially solid, cylindrical and of a consistent cross section along its length. However, at each end 17, 18 of the roller axle 16, the ends 17, 18 are radially spread to ensure that a roller 40 (see FIG. 5) mounted thereon is spaced from the corresponding head portion 15. The frame 11 of wheel 10 accordingly includes the integrally formed hub 12, radial arms 14 and roller axles 16.

Figures 3A, 3B:
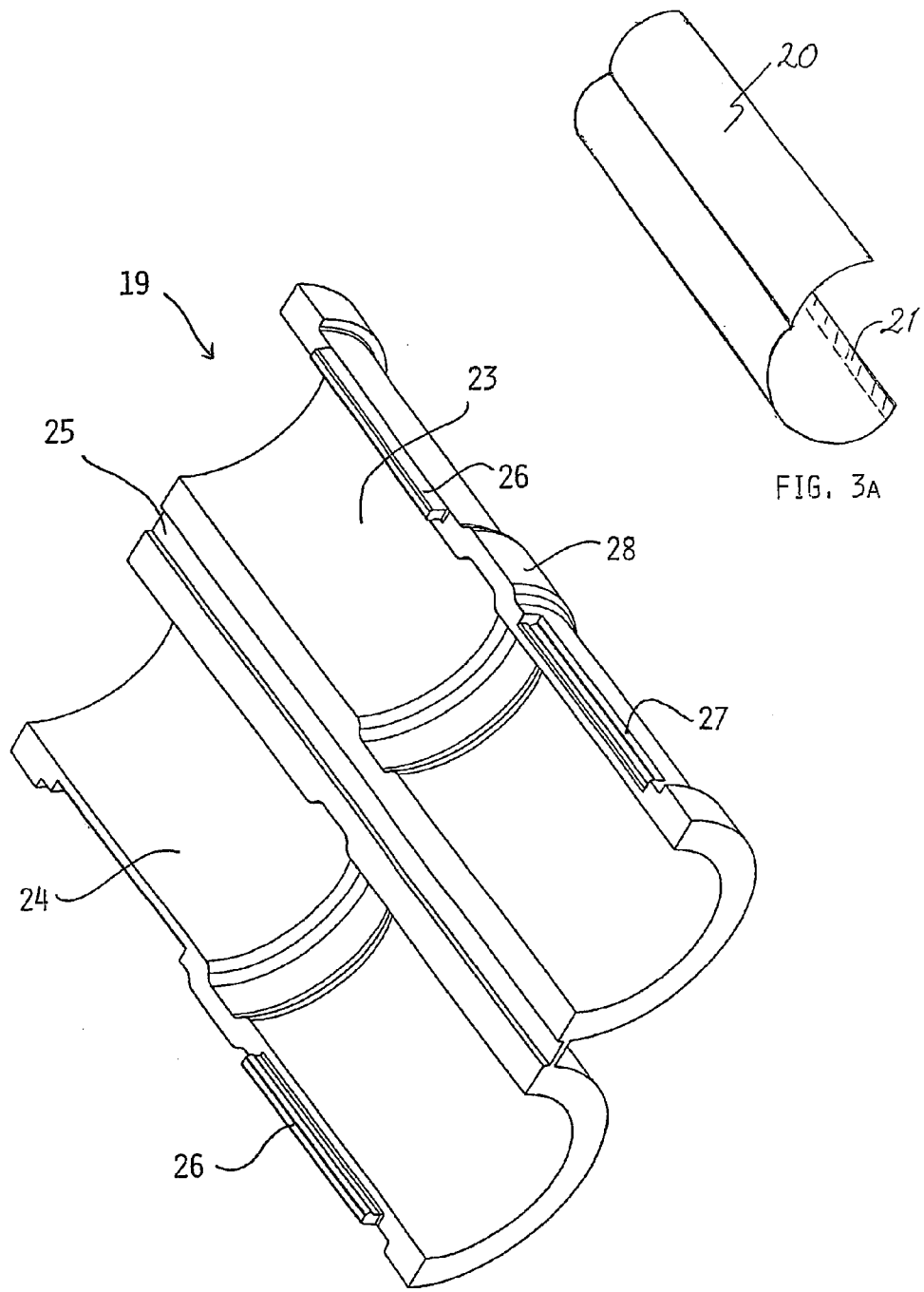
FIG. 3a is a perspective view of a temporary sleeve.
FIG. 3b is a perspective view of a hinged bush used to clip around a roller support of the parts of FIGS. 1 and 2.

After the frame 11 is integrally formed by an injection molding process, rollers 40 must be formed on or about the roller axles 16. In one arrangement this is done by attaching a temporary sleeve 20 (see FIG. 3a) to the roller axle 16. The sleeve 20 material may be any easily selectively degradable material able to withstand the injection molding process. For example the sleeve 20 may be made from a thin polymer film which is dissolvable in a solvent in respect of which the frame 11 and rollers 40 are stable. The sleeve 20 may include a line of adhesive 21 whereby to attach the sleeve 20 to the axle 16. Preferably, the sleeve 20 is made from thin material to minimize play between the roller 40 and the roller axle 16. Once the sleeve 20 is attached, the process involves surrounding the sleeve 20 and axle 16 with a two-part roller die (not shown). The roller die and the temporary sleeve 20, therefore, define the shape of the roller 40 formed therein. Preferably, the means of formation of the roller 40 are by injection molding into the roller die. The roller die may comprise one part which fits complementarily of the top side of the frame and a second part for the underside of the frame 11. The temporary sleeve 20 may then be selectively removed by a solvent in respect of which the frame 11 and the roller 40 is stable. In this arrangement, the roller 40 comprises a particularly hard material adapted to freely rotate about the roller axle 16 when under load.

A more preferred arrangement involves the attachment to the roller axle 16 of a permanent bush 19 adapted to rotate coaxially about the roller axle 16 with minimal free play. The flared ends of the roller axle 16 ensure that the bush 19 remains centrally located on the roller axle 16 and does not permit the bush 19 to or the roller tire 41 injection molded thereon to interfere with the head portion 15.

As best seen in FIG. 3, the bush 19 includes a pair of identical halves 23, 24 joined along mutually adjacent edges by a hinge 25 in the form of a thin elongate strip of material. The component parts 23, 24 and the hinge 25 are preferably integrally formed in a single process. However, it will be noted that the halves 23, 24 are identical and can be formed using the same dye. In such an arrangement, the halves 23, 24 are formed separately without a hinge and are joined by mechanical means. In the embodiment shown in FIG. 3, the hinged halves 23, 24 include complementary male and female engagement means 26, 27 whereby the bush 19 may be wrapped around a roller axle 16 and clipped together by the operation of the male and female engagement means 26, 27 to form a cylindrical sleeve wrapped around the roller axle 16 but free to rotate thereabouts.

The bush 19 includes surface features, such as the annular band 28 to assist the adhesion of the roller tire 41 material to the bush 19. The surface features may include ridges, grooves, hooks and ledges, etc which extend laterally as shown with feature 28 or randomly longitudinally or diagonally or a combination of all of the above. The surface features may therefore include random features, such as random nodules or protrusions.

The bush 19 is preferably made from an extremely strong material, such as acetal resin, and preferably is made from rigid plastics material.

The frame 11 may be made from a range of materials such as polypropylene or high density polyethylene, optionally reinforced by additives such as mica or glass. However, it is preferred that the frame 11 be made from a particularly strong and rigid material such as nylon 66.

Accordingly, the wheel 10 may be formed by first integrally molding a frame 11, attaching a plurality of cylindrical bushes 19, inserting the frame 11 and bushes 19 in a die defining a corresponding plurality of roller tire cavities, injection molding the roller tires 41 using a suitable material, such as polyurethane, and removing the dies after a suitable cure time resulting in a finalised wheel 10 product. The wheel 10 may be used in applications requiring support of articles of light load where the edge of a roller 40 making ground contact is satisfactory for the purpose.

The frame 11 further includes engagement means for attaching the frame 11 to another frame of like construction. Accordingly, the frame 11 includes studs 29 extending normal to the general plane of the wheel 10 which are engageable in an interference fit with corresponding recesses 30 best seen in FIG. 2. Of course, it is possible to produce a frame 11 with studs 29 on one face of the frame and recesses 30 on the opposing face. However, in the embodiment shown, the studs 29 are formed on one frame 11 and the recesses 30 are formed on a second frame 50 of different construction with regard to this aspect but the same as frame 11 in relation to other aspects. To combine the frames 11 and 50, the studs 29 and recesses 30 are lined up in registration and the studs 29 are inserted into the recesses 30. It will be noted that the studs 29 are located intermediate adjacent radial arms 14, whereas the recesses 30 are located in line with the radial arms 14. The studs 29 and recesses 30 may be fixedly secured to one another by a number of means. For example, the engagement means may involve a simple interference fit. However, preferably additional engagement means are provided in the form of adhesives, pressure welding or heat welding. Preferably, the additional engagement means involves ultrasonic welding to ensure a strong bond is formed between the studs 29 and recesses 30. It will further be noted that the studs 29 are inset within the profile of the frame 11 whereas the recesses 30 extend proud from the frame 50. Accordingly, when the frames 11, 50 are fixedly secured to one another, the opposing faces of the respective hubs 11 abut together in solid engagement.

As seen in FIGS. 4 and 5, the frames 11, 50 in combination form a wheel 60, each frame 11, 50 having a series of rollers 40 regularly spaced around a rim portion 31 comprising two rims 32, 33. Each of the rims 32, 33 have a series of rollers 40 regularly spaced around the rims 32, 33. The rollers 40 are rotatable about a roller axis transverse to the main axis 6a of the main axle 6.

The rim portion 31 is spaced apart from the central hub 12 by the radial arms 16. The radial arms 16 extend from the central hub 12 to the rims 32, 33 and are formed in two parallel planes to form two parallel parts 34, 35 of the wheel 60.

Each of the rollers 40 as seen in side elevation is in the shape of a by-truncated ellipse having a larger diameter in the middle than at its respective ends. Considerable overlap is provided between diagonally adjacent rollers 40 when viewed from the side elevation of the wheel 60. This is particularly important as the utility of the wheel 60 depends on good ground contact being made by the middle portion of the roller 40 when travelling in a direction transverse to the main axis 6a, particularly for applications such as the support of heavy loads, as opposed to single frame 11 applications described with reference to the wheel 10 in FIG. 1.

It is seen that the rollers 40 on the two rims 32, 33 in combination present a twin rim 31 having a substantially continuous circular profile. This circular rim 31 profile enables the wheel 60 to provide a smooth rotation over the ground travelling in a direction transverse to the main axis 6a and relatively smooth travel in directions parallel to the main axis 6a. Moreover, the combined effect of the circular rim 31 profile, together with the large diameter of the two parts 34, 35 and the substantial overlap between diagonally adjacent rollers 40, provides the wheel 60 with relatively smooth travelling directions parallel to the main axis 6a. The rollers 40 are formed onto the corresponding bushes 19 which extend between adjacent ends of the axial arms 14 as sleeves rotatably mounted around the corresponding roller axles 16. A roller tire 41 is applied to the bush 19 and is therefore able to rotate about the roller support corresponding to the roller axle 16.

Figure 2:
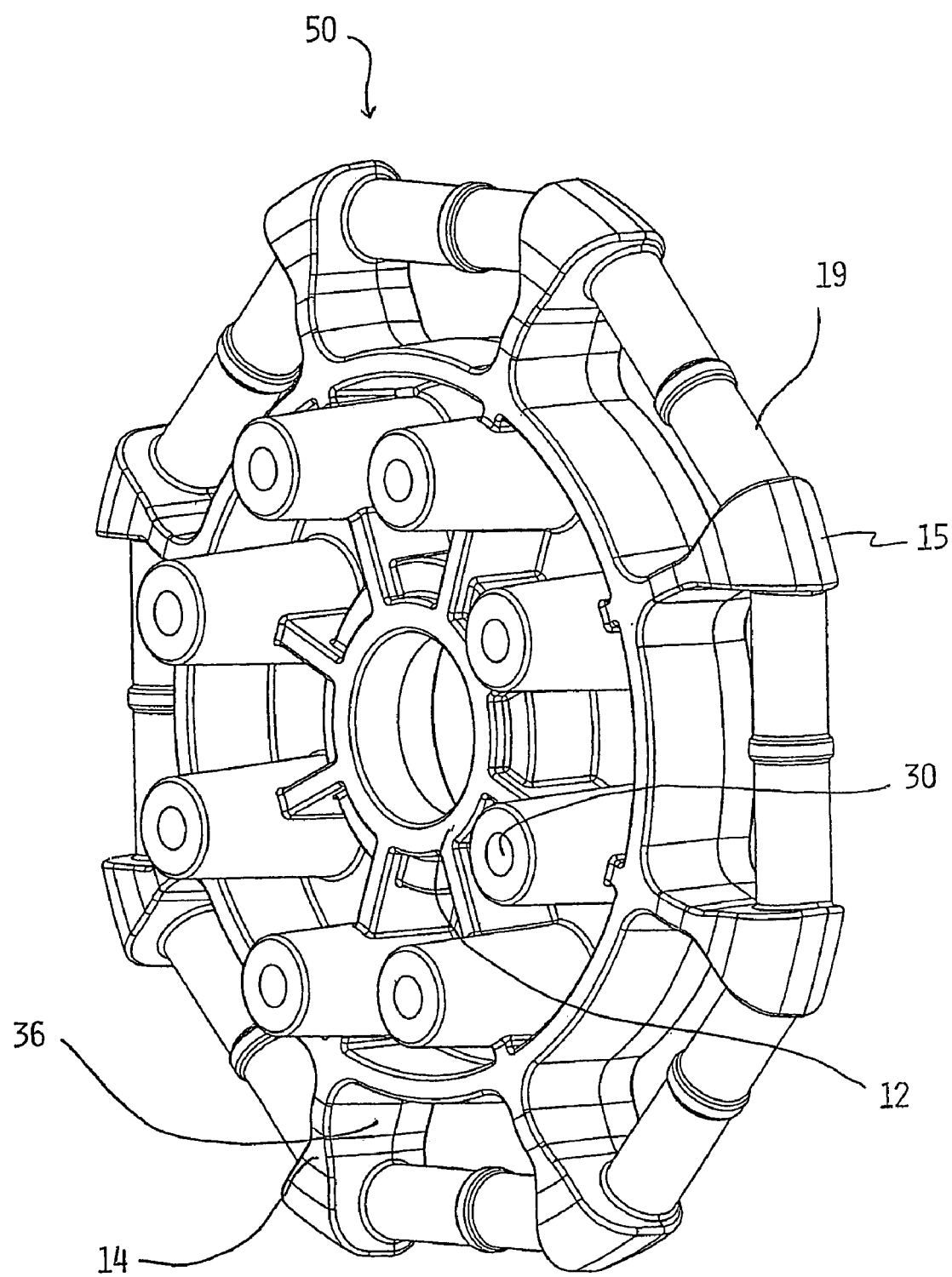
FIG. 2 is a perspective view of the other part which is joined together with the part of FIG. 1 to form a wheel according to a first embodiment.

During manufacture, the two parallel parts 34, 35 are formed in integral pieces by injection molding. The integral parts include the central hub portion 12, the radial arms 14 and the roller supports 16. Complementary protrusions 29 and recesses 30 are formed in the respective hub portions 12 of frames 11, 50 as seen in FIGS. 1 and 2 respectively. It is seen that the bisecting part line 36 of injection molding is through the center of each of the parts 34, 35 along a line corresponding to the general plane of each of frames 11, 50 normal to the main axis 6a. The roller supports 16 are integrally molded with the radial arms 14 and the central hub 12 during the molding process whereby to separately form the frames 11, 50 during the molding process. The hinged bushes 19 are then applied to the roller supports 16. The bushes 19 which are formed in halves are clipped around the roller supports 16 of each part 34, 35. The parts 34, 35 are then inserted into another mold and tire material is injected onto each bush 19 to form the rollers 41. The two parts 34, 35 complete with rollers 40 attached thereto, are joined by the engagement of the studs 29 and the recesses 30 and are ultrasonic ally stud-welded together completing the wheel 60.

Figure 6:
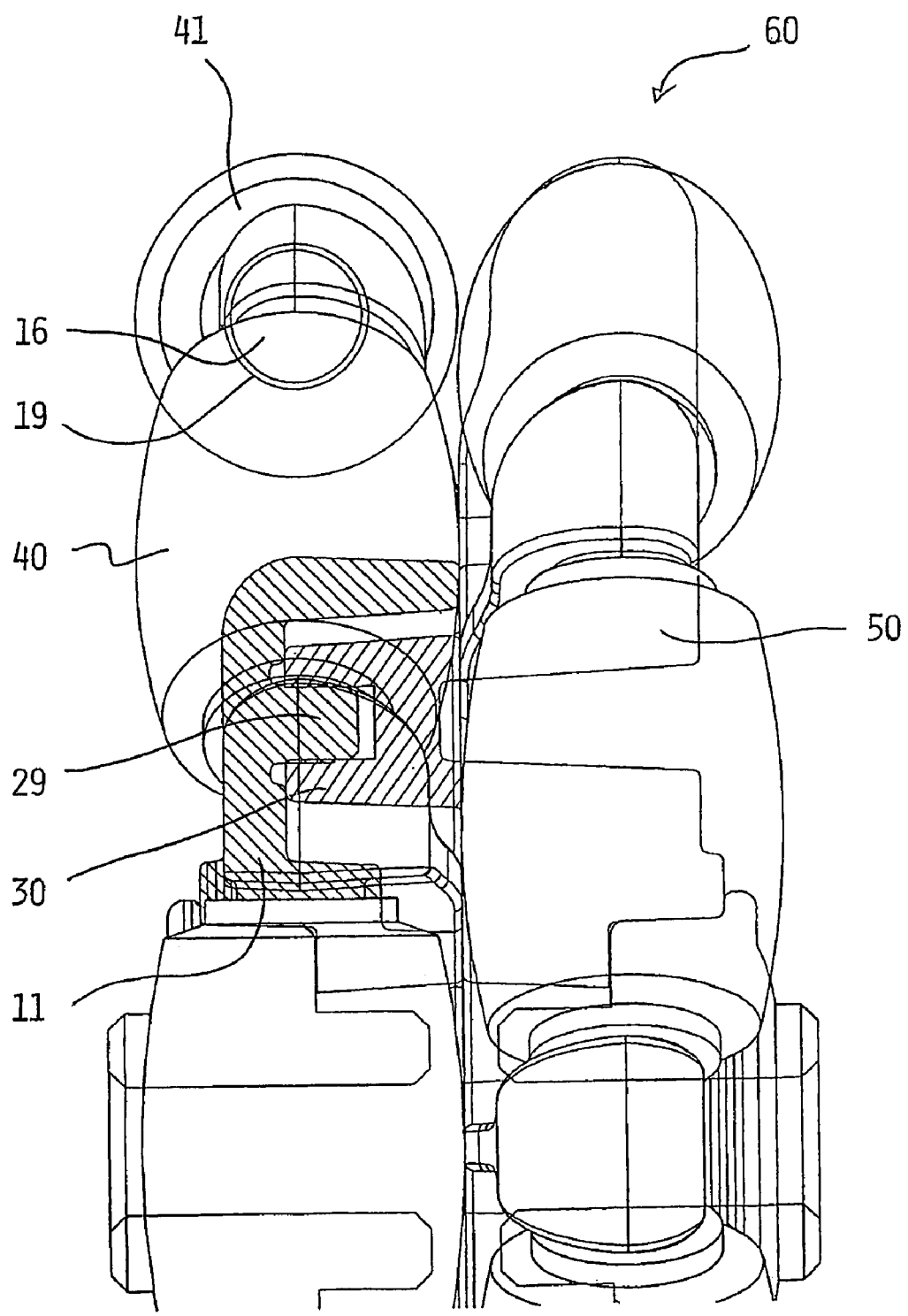
FIG. 6 is a sectional view showing an ultrasonic ally stud weld joined between the two parts.

In FIG. 6, the structure and the wheel 60 is shown in greater detail. The respective frames 11, 50 are ultrasonically welded together following the engagement of the studs 29 with the recesses 30 to form a very strong and rigid bond. The rollers 40 are seen in cross-section showing the roller support, (roller axle 16), the bush or sleeve 19, 20 and the roller tire 41.

Figure 7:
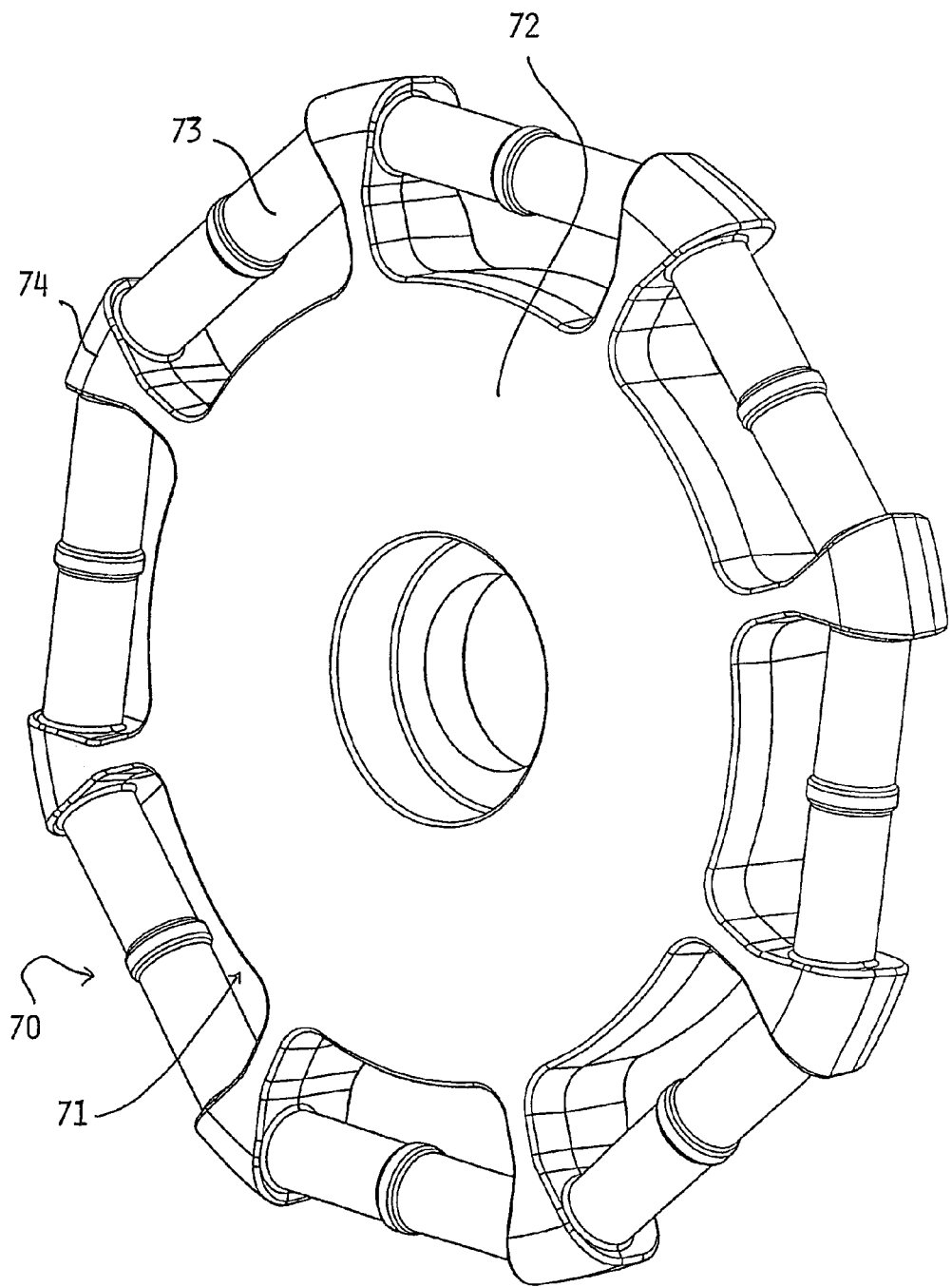
FIG. 7 is a perspective view of another embodiment of the wheel.

Another embodiment of a wheel according to the invention is shown in FIG. 7. The wheel 70 includes a frame 71 in which the hub 72 and radial arms 74 includes no engagement means to combine with a second frame. Accordingly, frame 71 is usable as a single framed wheel like that of wheel 10 according to the invention. In the drawing, the bushes 73 are shown already attached to the frame 71.

Figure 8:
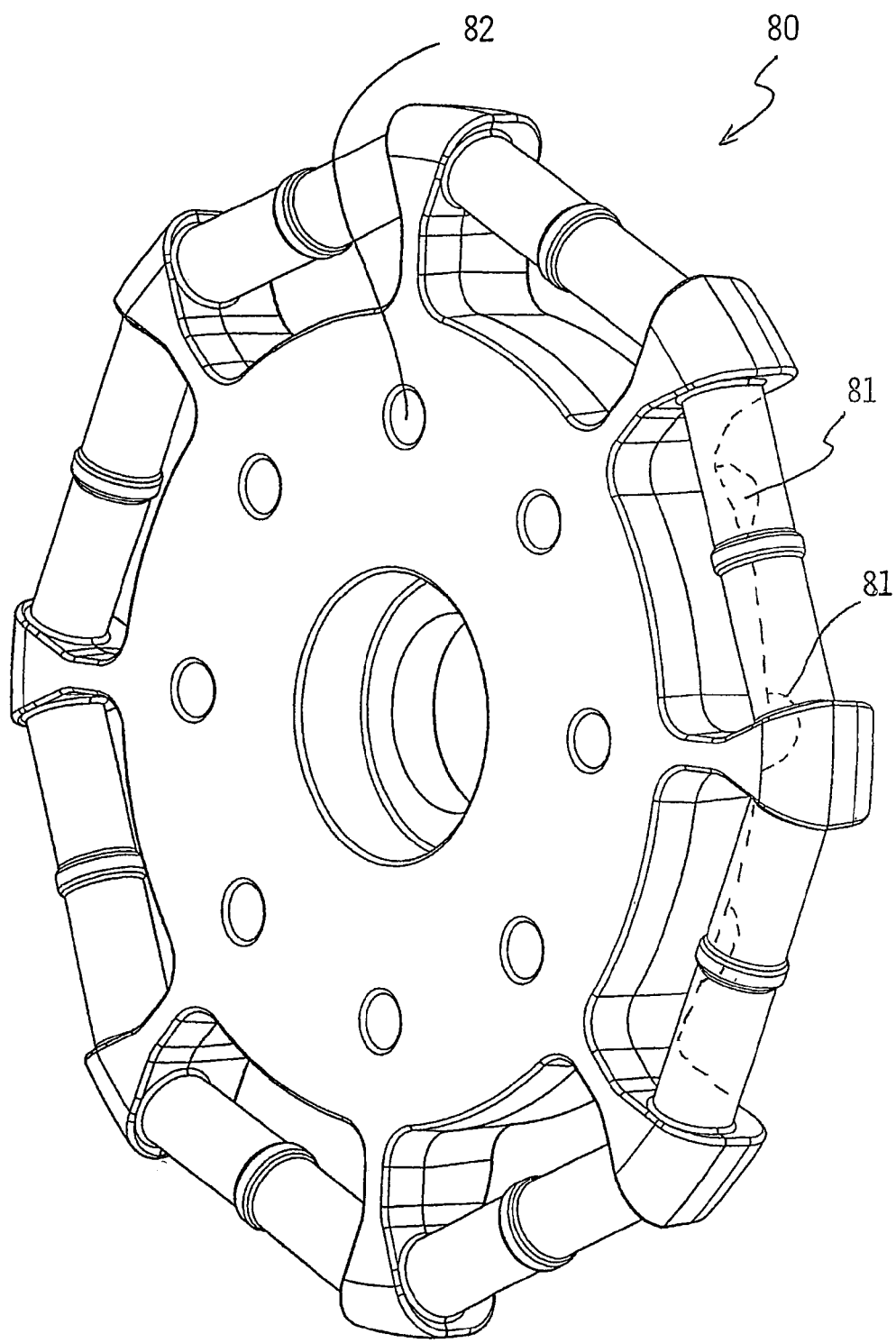
FIG. 8 is a perspective view of still another embodiment of the wheel.

In FIG. 8, there are shown another frame 80 including both male and female engagement means 81, 82. Accordingly, in this embodiment, only a single frame 80 need be manufactured and may be used in a single framed wheel, a double framed wheel, a triple framed wheel, etc., according to the application.

In terms of suitable materials for each of the components, it has been found that the preferred materials are as follows: Nylon 66 for the frame 11, 50, 71 including the hub 12 72, radial arms 14, 74 and roller axles 16, acetal for the bushes 19 and polyurethane for the roller tires 41. However, the person skilled in the art will appreciate that many other materials may be suitably used to achieve a workable wheel particularly adapted to the application intended. In some cases, particularly where heavy loads are anticipated, some components of the wheel 10, 60 may be replaced with metal components, such as steel, preferably stainless steel. In particular, the frame 5, 50, 71 may be made from stainless steel in applications where particularly heavy loads are anticipated. Where noise levels are an issue, such as in shopping centers and offices, the roller tires 41 are preferably made of a soft material (such as a soft grade of polyurethane) to dampen the noise created, possibly sacrificing properties such as hard wearing and abrasion resistance for quieter performance.

It is seen that the manufacture of the wheel according to the preferred embodiment provides an improved manufacturing process which provides for a multiple directional wheel to be manufactured in an easy and efficient manner.

Throughout the specification and claims the word "comprise" and its derivatives are intended to have an inclusive rather than exclusive meaning, that is, to be open language rather than closed language.

Although this invention has been described above with reference to particular means, materials, and embodiments, it is to be understood that the invention is not limited to these disclosed particulars, but extends instead to all equivalents within the scope of the following claims. It will be appreciated by those skilled in the art that many modifications and variations may be made to the embodiments described herein without departing from the spirit or scope of the invention.

The invention claimed is:

1. A multiple directional wheel including:
    (a) a frame having a central hub rotatable about a main axis and a plurality of roller supports radially spaced from said central hub;
    (b) a plurality of rollers evenly spaced around the circumference of said wheel and
    rotatably mounted on said roller supports, said rollers rotatable about a corresponding
    plurality of roller axes aligned in the plane of said wheel and transverse to said main axis;

wherein said frame is integrally formed in a first molding process and said rollers are formed in place on the wheel about said roller supports in a separate process.

2. A wheel according to claim 1, wherein each said roller includes:
   a bush rotatably mounted on a corresponding said roller support, which bush defines a
   recess operative to receive said roller support; and
   a tire fixedly secured to said bush.

3. A wheel according to claim 2, wherein said bush includes bush components attachable together for mounting onto said roller support.

4. A wheel according to claim 3, wherein said bush components are a pair of halves hinged along adjacent longitudinal edges of said components.

5. A wheel according to claim 2, wherein said bush has external surface features to adhere said tire to said bush.

6. A wheel according to claim 2, wherein said tire is a molding on said bush.

7. A wheel according to claim 2, wherein said roller is formed by injection molding material directly onto said bush.

8. A wheel according to claim 2, wherein said recess is a central, longitudinally extending bore.

9. A wheel according to claim 1, wherein said frame includes a plurality of arms extending from said hub to said roller supports.

10. A wheel according to claim 9, wherein said arms extend radially from said hub.

11. A wheel according to claim 9, wherein each of said roller supports extends between adjacent said arms and coaxially with a corresponding said roller axis and is in the form of a roller axle.

12. A multiple directional double wheel including a pair of wheels, each of the first and second wheels according to said wheel defined in claim 1, wherein said second wheel is fixed to said first wheel, the rollers of said second wheel are offset relative to the rollers of said first wheel about said double wheel's main axis whereby, when viewed in side elevation, the circumferential outline of said double wheel is substantially continuous and circular.

13. A multiple directional double wheel according to claim 12, wherein said first and second wheels are formed separately and include complementary male and female engagement means by which they are joined.

14. A multiple directional double wheel according to claim 12, wherein said first and second wheels are joined by ultrasonic welding.

15. A multiple directional wheel for movably supporting an article including:
   (a) a pair of opposed separately integrally formed first and second frames, each said frame including a central hub rotatable about a main axis, a plurality of radial arms extending outwardly from said central hub and roller supports extending between adjacent said radial arms, said roller supports being integrally molded with said central hub and said radial arms;
   (b) a discontinuous rim mounted on each said central hub, said first frame offset relative to said second frame about said main axis whereby, when viewed in side elevation, the circumferential outline of said wheel is substantially continuous and circular; and
   (c) a plurality of rollers together forming each said rim, said rollers being regularly spaced around each said rim, each said roller rotatable about a roller support having one of a plurality of roller axes, each said roller axis aligned transverse to said main axis, wherein each said roller includes a roller tire and a bush, each said bush being able to rotate around said roller support and about the corresponding roller axis, each said tire formed on each corresponding said bush to form each said roller.

16. A method of forming a multiple directional wheel comprising:
   (a) forming a frame comprising a central hub rotatable about a main axis and a plurality of roller supports spaced from said central hub, said roller supports being integrally molded with said central hub, each said roller support aligned with one of a plurality of corresponding roller axes, each said roller axis aligned in the general plane of said frame transverse to said main axis;
   (b) mounting a bush around each said roller support, each said bush being able to rotate around one of said roller supports about its corresponding roller axis; and
   (c) forming a tire around each of said bushes in place on said frame whereby each said tire and bush combination constitutes a roller.

17. A method according to claim 16, wherein said frame further includes a plurality of arms interposed between said hub and said roller supports to space the roller supports radially from the hub.

18. A method of forming a multiple directional wheel according to claim 17 wherein each said roller support comprises an axle extending between adjacent arms.

19. A method of forming a multiple directional wheel according to claim 16 further comprising:
   (d) securely fixing a second frame like the first said frame to said first frame such that said second frame is axially offset relative to said first frame about said main axis and is coaxial with said first frame so that said first and second frames are rotatably mountable on a single axle.

20. A method of forming a multiple directional wheel according to claim 19 wherein said securely fixing a second frame to said first frame involves welding said first and second frames together.

21. A method of forming a multiple directional wheel according to claim 20 wherein said welding involves ultrasonic welding.

22. A method of forming a multiple directional wheel according to claim 19 wherein the material from which each of said first and second frames is molded is an acetyl resin.

23. A method of forming a multiple directional wheel according to claim 19 wherein one or both of said first and second frames includes male engagement means and one or both of said first and second frames includes complementary female engagement means.

24. A method of forming a multiple directional wheel according to claim 16 wherein, in said mounting a bush around each said roller support, said bush is formed from two halves which are attached to said roller support.

25. A method of forming a multiple directional wheel according to claim 24 wherein said two halves are hinged prior to attachment and said mounting a bush around each said roller is performed by clipping said two halves together to form a hollow cylindrical sleeve rotatably surrounding said roller support.

26. A method of forming a multiple directional wheel according to claim 16 wherein, in said forming a tire around each of said bushes in place on said frame, the tire is formed by molding said tire material in a roller dye in place around said bush in turn in place around said roller support.

* * * * *